United States Patent
Heuer et al.

(10) Patent No.: US 7,147,146 B2
(45) Date of Patent: Dec. 12, 2006

(54) CONTROL OF COMMUNICATION IN ACCESS AND ENTRY SYSTEMS

(75) Inventors: Andre Heuer, Eching (DE); Birgit Bartel-Kurz, Erlangen (DE); Roland Plankenbuehler, Nuremberg (DE); Heinz Gerhaeuser, Waischenfeld (DE); Rolf Lakomy, Senden (DE)

(73) Assignees: Fraunhafer-Gesellschaft zur Foerderung der angewandten Forschung e.V., Munich (DE); Deutsch Telekim AG, Bonn (DE)

( * ) Notice: Subject to any disclaimer, the term of this patent is extended or adjusted under 35 U.S.C. 154(b) by 255 days.

(21) Appl. No.: 10/312,322

(22) PCT Filed: Jun. 11, 2001

(86) PCT No.: PCT/EP01/06600

§ 371 (c)(1),
(2), (4) Date: Oct. 1, 2003

(87) PCT Pub. No.: WO01/99038

PCT Pub. Date: Dec. 27, 2001

(65) Prior Publication Data

US 2005/0078702 A1   Apr. 14, 2005

(51) Int. Cl.
*G06K 5/00* (2006.01)
(52) U.S. Cl. ...................... 235/375; 235/451
(58) Field of Classification Search ........... 235/375, 235/451; 710/16
See application file for complete search history.

(56) References Cited

U.S. PATENT DOCUMENTS

| 4,924,210 A | | 5/1990 | Matsui et al. | 340/572 |
| 5,847,447 A | * | 12/1998 | Rozin et al. | 257/678 |
| 6,199,120 B1 | * | 3/2001 | Tanaka | 710/16 |
| 6,354,489 B1 | * | 3/2002 | Tanaka | 235/375 |
| 6,779,724 B1 | * | 8/2004 | Yamada | 235/451 |

FOREIGN PATENT DOCUMENTS

| EP | 513 507 | 11/1992 |
| EP | 0513507 | 11/1992 |
| WO | WO 91/07065 A1 | 5/1991 |
| WO | WO 99/01960 | 1/1999 |

* cited by examiner

*Primary Examiner*—Michael G. Lee
*Assistant Examiner*—Jamara A. Franklin
(74) *Attorney, Agent, or Firm*—Michael A. Glenn; Glenn Patent Group

(57) ABSTRACT

In a system comprising a transmitter, a receiver, and a module, a communication object is transmitted from the transmitter to the receiver which comprises a payload data block containing data for generation of a command to the chip module obeying a communication protocol specific for the chip module, and a parameter block comprising at least one instruction which defines how the generation of the command to the chip module is to be performed, thereby facilitating a control and change of the communication protocol between the receiver and the module.

9 Claims, 2 Drawing Sheets

CONTROL OF COMMUNICATION IN ACCESS AND ENTRY SYSTEMS

BACKGROUND OF THE INVENTION

1. Field of the Invention

The present invention relates to the control of the communication between a receiving means and a module communicating with the same, and in particular to such methods and devices suitable for being used in conditional access and access control systems, wherein single chip modules are used in terminal devices.

2. Description of Prior Art

The term "single chip module" generally includes chip modules as they are for example used with EC-cards, telephone cards, in cards for access control, in cards for conditional access systems or in cards for authentication. The term single chip module further includes such chip modules which are either integrated in devices in the form of components or which extend those devices.

The use of EC (eurocheque) cards as a means of payment has become a firm part of today's payments. With these cards so-called smart cards (intelligent cards) are used in order to save or process information, like for example crypto keys or cryptograms. But also in many other areas smart cards are used increasingly, like for example with telephone cards, credit cards and other electronic identifications. A single chip module or one chip module, respectively, is a central component of these smart cards, wherein its functionality may reach from the one of a memory medium to the one of a crypto chip. Apart from the replaceable single chip modules which are arranged on card carriers there exist further ones which are directly integrated in devices in order to store data, like for example a crypto key, safe from an unauthorized access.

The systems in which single chip modules are used may generally be classified into two groups. Conditional access systems are systems with a restricted access, like they are for example used when receiving chargeable pay-TV or other media services. The terminal and receive devices, respectively, which are used with these conditional access systems include for example pay-TV decoders and decoding devices, respectively, or mobile receive devices, like for example mobile telephones. Access control systems, however, include systems or applications for access control, like they are for example used in the form of credit cards for assuring a safe cashless money transfer or in the form of money cards and telephone cards as a replacement for cash. The terminal devices used with these systems include for example credit card or bank terminals. Safety modules, like for example single chip modules are used everywhere today, where confidential information is to be stored so that it cannot be read out, is transportable and protected against third party access.

Chip cards, like they are for example used with conditional access systems, are used for the terminal device-sided storage of receive authorizations for services, like for example receiving certain chargeable TV programs and of cryptographic keys. Such chip cards are in most cases not firmly connected to a terminal device, like for example a pay-TV decoder, but are removable and exchangeable from the same. Examples for such exchangeable chip cards for a storage of cryptographic keys and receive authorizations on the terminal device-side are pay-TV smart cards or credit cards. To this end, reference is made to the article "Conditional Access or Wie kann man den Zugriff auf Rundfunksendungen kontrollieren?" by Jörg Schwenk in Bernd Seiler (ed.): Taschenbuch der Telekompraxis 1996, Schiele & Schön, Berlin 1996.

In operation, the single chip module is communicatively connected to the respective terminal device into which the single chip module is inserted, for example via a card reader or a fixed wire, if the single chip module is integrated into the terminal device. The communication of the single chip module with the terminal device is defined via a communication protocol, which is determined in the ISO standard 7618. The ISO standard guarantees that the communication between the terminal device, like for example the pay-TV decoder, and the single chip module is uniformly determined on the protocol level, especially with applications in which exchangeable single chip modules such as those which are integrated in smart cards are used.

Depending on the application or use, respectively, an additional software may be installed in the single chip modules, which requires an application-dependent communication software adjusted to this additional software on the side of the terminal device. In case for example that due to increased safety requirements, due to a compromised system with restricted access or for performance increase of a single chip module a new single chip module with a new software is to be used, it may be required to change the application specific communication protocol. This causes that the software needs to be updated with all associated terminal devices. These necessary adaptations lead to incompetitively high costs, if they are implementable at all, mainly with mobile terminal devices, like for example devices firmly built into vehicles.

One disadvantage with today's systems based on single chip modules is therefore that the communication software in the respective terminal devices is only designed for a data communication protocol format which is specific for the single chip module at the time of generating the communication software. If a different communication protocol for a communication between the single chip module and the terminal device or another single chip module is to be used with a different data communication protocol at a later point of time, because for example safety problems occurred due to pirate attacks in a safety system, then, apart from the single chip module, also the software on the terminal device side needs to be changed or the terminal device needs to be exchanged. In the case of cashless money transfer the bank terminals would for example have to be adapted when introducing new bank or credit cards, which would require considerable efforts.

SUMMARY OF THE INVENTION

It is the object of the present invention to provide a device, a method and a signal which facilitate a control and change, respectively, of the communication protocol between a terminal device and a module associated with the same, which is not very cost and time consuming.

According to a first aspect of the invention this object a method for controlling the communication in a system comprising a transmitter, a receiver and a chip module, wherein the transmitter and the receiver are communicatively connected and wherein the chip module is communicatively connected to the receiver and inserted in the same, comprising the following steps:

transmitting a communication object from the transmitter to the receiver, wherein the communication object comprises a parameter block in which at least one instruction is defined which defines how communication between the receiver and the chip module are to be performed, and a payload data block, in which data is defined which causes a communication between the receiver and a chip module; interpreting the instruction within the parameter block by the receiver in order to control a communication protocol of the receiver for communicating with the chip module; and processing the data defined within the payload data block according to the communication protocol of the receiver by the receiver, whereby the communication between the receiver and the chip module caused by the data defined in the payload data block is performed according to the communication protocol of the receiver.

According to a second aspect of the invention the above object is achieved by a device for controlling the communication in a system comprising a transmitter, a receiver and a chip module, wherein the transmitter and the receiver are communicatively connected and the chip module is communicatively connected to the receiver and inserted into the same, the device comprising:

a generator within the transmitting means for generating a communication object, wherein the communication object comprises a parameter block in which at least one instruction is defined defining how the communication between the receiver and the chip module is to be performed, and a payload data block in which data is defined causing a communication between the receiver and the chip module; and a means for transferring the communication object from the transmitter to the receiver.

According to a third aspect of the invention this object is achieved by a signal for transferring from a transmitter to a receiver, for controlling the communication within a system comprising the transmitter, the receiver and a chip module, wherein the transmitter and the receiver are communicatively connected and wherein the chip module is communicatively connected to the receiver and inserted into the same, wherein the signal comprises a payload data block and a parameter block, wherein data is defined in the payload data block causing a communication between the receiver and the chip module, and wherein instructions are defined within the parameter block, defining how the communication between the receiver and the chip module is to be performed.

The present invention is based on the findings that the problem of having to update the software of terminal devices or even having to exchange the terminal devices if the communication protocol for the communication between the module and the terminal device changes, may be eliminated by the fact that data is transferred from the transmitting means to the terminal device that defines the communication between the terminal device and the respective module. This transfer of data defining the communication between the terminal device and the module from the transmitting means to the receiving means facilitates that updates, improvements or other changes of the communication protocol for the communication between the terminal device and the module make change measures necessary only in the transmitting means. Instead of having to adapt a plurality of terminal devices only the transmitting means needs to be changed and re-programmed, respectively, like for example the encoding system and the encoder system, respectively. In other words, the system update, which is little cost and time consuming, is achieved by introducing a communication method between a position generating an encrypted or non-encrypted information for a transfer to a single chip module and a single chip module like for example a safety module in systems or applications for access control or conditional access control. The communication method describes how the communication with a single chip module in a terminal device may be performed independent of the implemented technology.

According to one embodiment, the communication object further comprises a payload data block in which data is defined which causes a communication between the receiving means and the module. The data defined in the parameter block may include a plurality of parameter data fields in which at least either a specification of the type of a module specific communication protocol which is to be used for a communication between the receiving means and the module, an instruction of how the payload data block is to be interpreted by the receiving means, and an instruction for requesting the module to answer to an already transferred payload data block, or an instruction of how the receiving means is to interpret the answer of the module, may be contained.

According to a further embodiment, the module is an exchangeable module, like for example a single chip module, a smart card or a safety module, like they are used in conditional access or access control systems, like for example with EC-cards, pay-TV services, credit cards, telephone cards, etc. When introducing new modules which require a different communication protocol, consequently only a change of the parameter blocks is necessary in order to convey the new communication protocol to the terminal device.

It is an advantage of the present invention, that the communication of a terminal device with a single chip module may be guaranteed independent of the communication protocol of the software of the single chip module in systems or applications in which single chip modules are used.

It is a further advantage that the present invention enables that the communication between a terminal device, like for example a TV decoder for pay-TV applications and a chip card is also guaranteed with changing chip card types, if for example different non-compatible chip cards are to be used in a chip card system.

BRIEF DESCRIPTION OF THE DRAWINGS

In the following, preferred embodiments of the present invention are explained in more detail referring to the accompanying drawings, in which.

DESCRIPTION OF PREFERRED
EMBODIMENTS OF THE INVENTION

Figure 1:
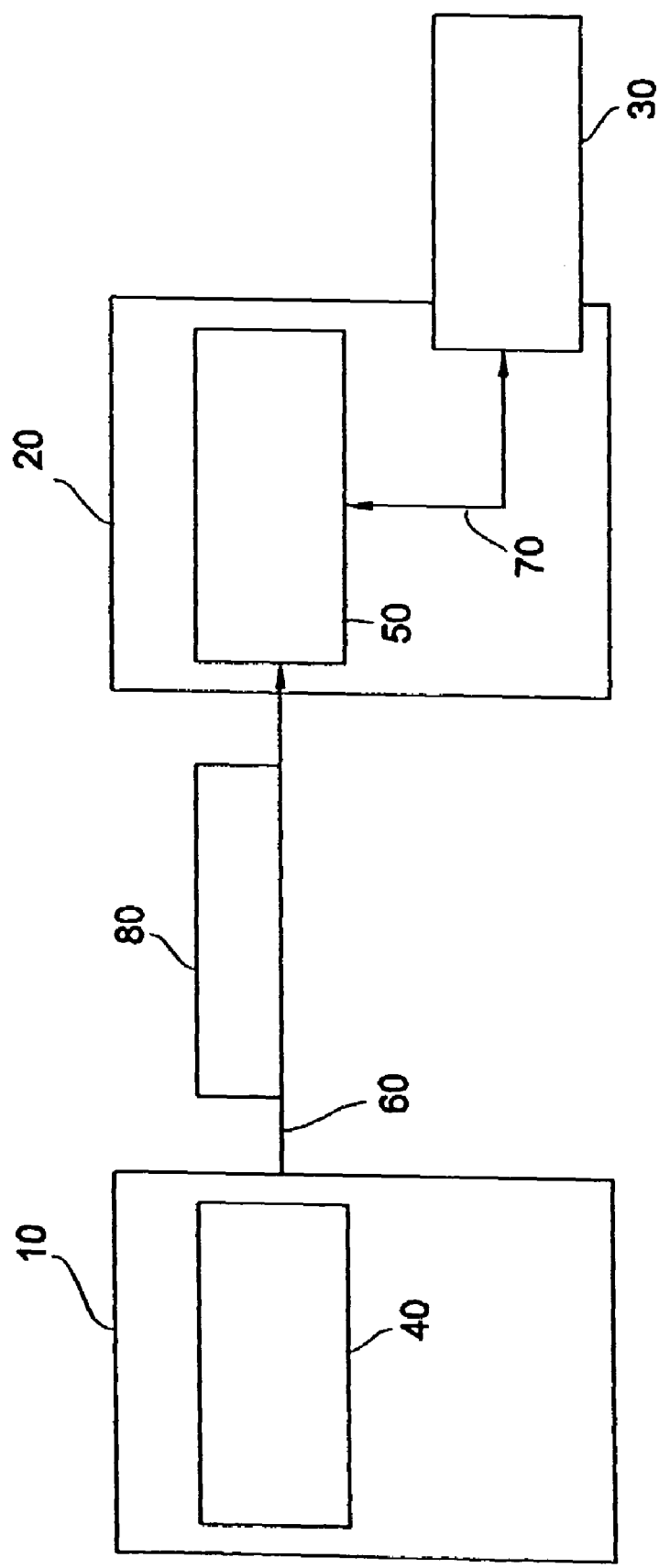
FIG. 1 shows a block diagram of a system with a single chip module, illustrating the use of communication objects according to an embodiment of the present invention.
Figure 2:
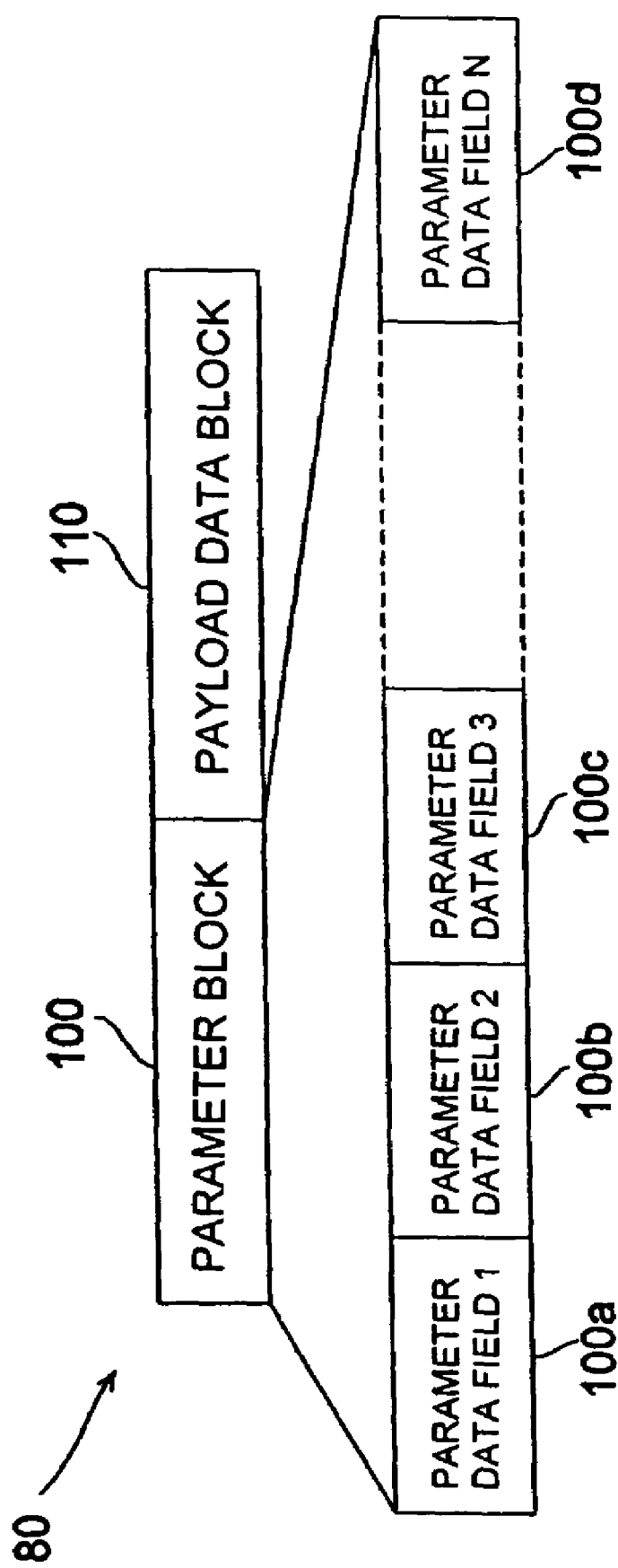
FIG. 2 shows a schematical outline, illustrating the setup of the communication objects of FIG. 1 according to an embodiment of the present invention.

Referring to FIG. 1 and 2, first of all the setup of a system with a single chip module according to an embodiment of the present invention is described. According to the embodiment described in the following, the system is a pay-TV system, comprising an encoding system 10 as a transmitting means, a decoding system 20 as a receiving means, like for example a decoder, and a single chip module 30 as a module, like for example a pay-TV smart card.

The encoding system 10 includes a communication object generator and a communication object generating means 40, respectively, while the decoding system 20 comprises a communication object interpreter 50. The encoding system 10 and the decoding system 20 are communicatively connected, by the communication object generator 40 of the encoding system 10 being connected to the communication object interpreter 50 of the decoding system 20 via a transmitting means 60, like for example radio or fiber lines. The communication object interpreter 50 is communicatively connected to the single chip module 30 over a suitable means 70, like for example a card reader, while the single chip module 30 is exchangeable, i.e. removable from the card reader and replaceable by another module. The data that the encoding system 10 sends to the decoding system 20 is contained within the communication objects 80 which are generated by the communication object generator 40 and transferred to the communication object interpreter 50 via the transmitting means 60. As it is illustrated in FIG. 2, a communication object 80 consists of a parameter block 100 and a payload data block 110. The parameter block 100 again consists of n parameter data fields 100*a*, 100*b*, 100*c* and 100*d*, wherein n is an integer greater than 0, and in FIG. 2 only four parameter blocks are shown as an example.

After the setup of the system and the setup of the communication objects have been described above, the functioning of the system of FIG. 1 is described in the following.

The encoding system 10 sends payload data via the transmitting means 60, like for example encrypted, chargeable TV programs, to the decoder 20. The decoder 20 decrypts the payload data received by the encoding system 10 by communicating with the single chip module 30 in order to read a cryptographical key or a receiving authorization stored on the same, or in order to access a crypto processor of the module 30. The payload data is contained in the payload data blocks 110. The payload data blocks 110 may further contain data for generating a command to the single chip module 30, which may require an answer and its interpretation, or data which are to be interpreted and processed in a different way by the decoder 20 in the terminal device. The data in the payload data block 110 may for example include a command in order to cause the release of a chargeable TV program by setting the receiving authorization in the single chip module 30 or in order to check the receiving authorization.

The data contained in the payload data blocks 110 requires a suitable communication between the decoding system 20 and the single chip module 30. In order to suitably control and change, respectively, the communication between the decoding system 20 and the single chip module 30, it is intended that the data contained in the payload data blocks 110 is processed according to the data contained in the respective parameter blocks. To this end, the parameter blocks 100 consist of one or several parameter data fields 100*a*–100*d* which contain parameters which have to be present, or such which may be used optionally. Compulsively present are such parameters which control or change, respectively, the communication between the single chip module and the terminal device, like for example commands, command flows, descriptions of subsequent payload data blocks, etc. Optional parameters include for example command parameters referring to corresponding commands in the command parameter data fields and only have to be sent if they deviate from a certain default value. Apart from that, parameters are only then compulsively necessary when the existing communication protocol actually has to be changed. Apart from a permanent control of the communication protocol for the communication between the terminal device and the single chip module, wherein a parameter block is transferred for each payload data block, it is further possible to change the communication protocol only as needed, for example when introducing new smart cards. In this case, a parameter block containing the necessary communication protocol changes is only sent if changes of the protocol are necessary, wherein in the meantime, i.e. with the same communication protocol, previously sent parameters are stored in the terminal device.

The parameter blocks 100 may further be differentiated according to different block types. According to their block type the individual parameters or groups of parameters in the parameter data fields 100*a*–100*d* may contain one or several of the following pieces of information:

classification of the characteristic of a payload data block, like for example classification of the payload data block as a command or as a section of encoded data, an instruction of how the corresponding payload data blocks 110 are to be interpreted by the decoder 20, like for example by stating an algorithm used for encoding and to be used for decoding or by stating a suitable command flow, wherein the commands in the command flow are contained in a command sentence of the interpreter 50 of the decoder 20, an instruction which informs about the type of processing of the payload data blocks 110 in the decoder 20, like for example about which clock frequency, voltages, etc. are to be used for a communication with the single chip module, and an instruction that the single chip module 30 requires and states for responses to one or several received instructions, about how the response of the single chip module 30 from the decoding system 20 is to be interpreted, like for example an instruction for checking an authentication.

Using the parameter blocks 100 an adjustment of the communication between the decoding system 20 and the single chip module 30, which is for example required due to a new type of single chip module, is to be performed without changing the software of the decoding system 20 by suitably setting the parameter data fields 100*a*–100*d*. Those parameter data fields 100*a*–100*d* describing the generation of a command to the single chip module 30 and/or the processing of a response from the single chip module 30 for example contain the type of a communication protocol which is specific for the single chip module 30.

For different single chip modules 30 different parameter data fields 100*a*–100*d* may be provided, so that it is possible to support additional single chip modules 30 by a terminal device also at a later point of time by encoding a corresponding parameter data field in the communication object 80 in the encoding system 10.

Consequently, it is possible in the system described above to decouple the tight binding of the communication interface between the terminal device and the single chip module implemented in many conventional safety systems. This is achieved by using a single chip module independent communication system. This communication system enables a transport of data generated within the encoding system to the decoding system and the single chip module encapsulated in the decoding system, which is transparent or comprehensive for the terminal device. The later use of a new single chip module incompatible to the preceding single chip module then requires only a change of the encoding in the encoding system without a change in the terminal device and in the decoding system, respectively, being required.

In other words, the communication system represents a container for payload data which is transported from the encoding system to the decoding system, wherein the container contains all information about how the payload data are to be processed in the payload data blocks in the terminal device in connection with the single chip module.

The invention therefore provides a system which uses a meta language or a communication description language, respectively, for the communication between a single chip module and a terminal device on the application level. All objects which are transferred to a terminal device comprising a single chip module and refer to the single chip module may be encoded using the meta language. The terminal device interprets the meta language and performs the communication instructions for the respective single chip module. By introducing the meta language, every data object may contain meta information for different single chip modules, so that different single chip modules comprising different application communication protocols may be used in the same terminal device. If new single chip modules comprising a changed application protocol are to be used, then only the meta description is to be changed or the same needs to be encoded additionally in a data object. A change of the software on the side of the terminal device is not necessary, however.

It is noted that although the description was described above referring to a pay-TV system, the invention may be used for all systems in which a module, like for example a single chip module, is or may be communicatively connected to a receiving device. The invention may be used advantageously in particular in such systems which are often subject to cost-intensive adaptations due to continuously developing safety techniques. Apart from the conditional access systems which the pay-TV system belongs to, the present invention is further applicable to access control systems. One example for an access control system is a cash dispensing system. In the case of a cash dispensing system a transmitting means would for example be a central control unit of a bank, while the receiving means would be a cash dispenser into which the EC-cards or credit cards with single chip modules may be inserted.

Although the single chip module was exchangeable in the present description, any module may be used instead of an exchangeable single chip module, which is suitable in order to communicate with the receiving means, i.e. either via a wireless or via a wire-bonded connection. The module may further be firmly integrated in the receiving means.

Although it was described above, that the payload data comprise encrypted data in the payload data blocks, it is further possible that the data contained in the payload data blocks are transferred unencryptedly.

Although it is illustrated in FIG. 2 that the parameter block is attached to the beginning of the payload data block, the parameter block may further be located behind the payload data block. It is further possible that a communication object only comprises one parameter block in order to cause a communication adjusted to the single chip module between the receiving means and the terminal device, respectively, and the module. The parameter block is for example only transferred to the terminal devices at certain times in order to update the control of the communication between the terminal device and the module for different types of payload data blocks in the terminal devices. Depending on the case of application it is possible that individual or several communication objects are transferred to the decoding unit via any data transfer systems consisting of single chip modules.

The invention claimed is:

1. A method for controlling the communication in a system comprising a transmitter, a receiver and a chip module, wherein the transmitter and the receiver are communicatively connected, and wherein the chip module is communicatively connected to the receiver and inserted in the same, comprising the following steps:

transmitting a communication object from the transmitter to the receiver, wherein the communication object comprises a payload data block which contains data fax generation of a command to the chip module obeying a communication protocol specific for the chip module, and a parameter block comprising at least one instruction which defines how the generation of the command to the chip module is to be performed;

interpreting the instruction within the parameter block by the receiver to yield generation information;

generating the command from the data defined within the payload data block dependent on the generation information by the receiver, and communicating the command to the chip module, whereby the command communicated from the receiver to the chip module obeys the specific communication protocol for the chip module.

2. The method according to claim 1, wherein the parameter block comprises a plurality of parameter fields, containing a plurality of parameters containing at least one of the following pieces of information:

a statement of the type of communication protocol which is specific for the chip module, which is to be used for a communication between the receiver and the chip module;

an instruction of how the payload data block is to be interpreted by the receiver;

an instruction for requesting the chip module to answer to an already transferred payload data block; and an instruction of how the receiver is to interpret the answer of the chip module.

3. The method according to claim 1, wherein the chip module is exchangeable.

4. The method according to claim 1, wherein the transmitter is a central transmitter of a conditional access system or an access control system, the receiver is a terminal device of the system and the chip module is a single chip module.

5. A device for controlling the communication in a system comprising a transmitter, a receiver, and a chip module, wherein the transmitter and the receiver are communicatively connected and the chip module is communicatively connected to the receiver and inserted into the same, the device comprising:

a generator within the transmitting means far generating a communication object, wherein the communication object comprises a payload data block which contains data for generation of a command to the chip module obeying a communication protocol specific for the chip module, and a parameter block comprising at least one instruction which defines how the generation of the command to the chip module is to be performed; and a means for transferring the communication object from the transmitter to the receiver.

6. The device according to claim 5, wherein the parameter block comprises a plurality of parameter fields containing a plurality of parameters, containing at least one of the following pieces of information:

a statement of the type of communication protocol which is specific for the chip module which is to be used for a communication between the receiver and the chip module;

an instruction of how the payload data block is to be interpreted by the receiver;

an instruction for requesting the chip module to answer to an already transferred payload data block; and an instruction about how the receiver is to interpret the answer of the chip module.

7. The device according to claim 5, wherein the chip module is exchangeable.

8. The device according to claim 5, wherein the transmitter is a central transmitter of a conditional access system or an access control system, the receiver is a terminal device of the system and the chip module is a single chip module.

9. Signal for transferring from a transmitter to a receiver, for controlling the communication within a system comprising the transmitter, the receiver, and a chip module, wherein the transmitter and the receiver are communicatively connected, and wherein the chip module is communicatively connected to the receiver and inserted into the same, wherein the signal comprises:

a payload data block and a parameter block, wherein the payload data block contains data for generation of a command to the chip module obeying a communication protocol specific for the chip module, and the parameter block comprises at least one instruction which defines how the generation of the command to the chip module is to be performed.

* * * * *

UNITED STATES PATENT AND TRADEMARK OFFICE
CERTIFICATE OF CORRECTION

| | | |
|---|---|---|
| PATENT NO. | : 7,147,146 B2 | |
| APPLICATION NO. | : 10/312322 | |
| DATED | : December 12, 2006 | |
| INVENTOR(S) | : Heuer et al. | |

It is certified that error appears in the above-identified patent and that said Letters Patent is hereby corrected as shown below:

Title Page, item (54) & Col. 1 Title, replace "Control of Communication in Access and Entry Systems"

with --CONTROLLING THE COMMUNICATION IN CONDITIONAL ACCESS AND ACCESS CONTROL SYSTEMS--

Signed and Sealed this

Twenty-seventh Day of May, 2008

JON W. DUDAS
*Director of the United States Patent and Trademark Office*